United States Patent
Jiang et al.

(10) Patent No.: US 9,361,127 B2
(45) Date of Patent: Jun. 7, 2016

(54) SWITCHING BETWEEN NETWORK INTERFACE CARDS DURING DIFFERENT STAGES OF OPERATION

(71) Applicant: Dell Products L.P., Round Rock, TX (US)

(72) Inventors: Hua Jiang, San Jose, CA (US); Manish Bhaskar, San Jose, CA (US); Satya Mylvara, Sunnyvale, CA (US); Sui Lam, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 334 days.

(21) Appl. No.: 13/946,932

(22) Filed: Jul. 19, 2013

(65) Prior Publication Data

US 2015/0026448 A1    Jan. 22, 2015

(51) Int. Cl.
*G06F 9/00* (2006.01)
*G06F 9/44* (2006.01)

(52) U.S. Cl.
CPC ............ *G06F 9/4416* (2013.01); *G06F 9/4401* (2013.01); *G06F 9/4406* (2013.01)

(58) Field of Classification Search
CPC .... G06F 9/4401; G06F 9/4406; G06F 9/4416
USPC ........................................... 713/1, 2; 709/222
See application file for complete search history.

(56) References Cited

U.S. PATENT DOCUMENTS

| | | | | |
|---|---|---|---|---|
| 5,978,912 A * | 11/1999 | Rakavy et al. | .................... | 713/2 |
| 6,314,525 B1 * | 11/2001 | Mahalingham et al. | ...... | 714/4.12 |
| 6,463,530 B1 * | 10/2002 | Sposato | ........................... | 713/2 |
| 6,487,601 B1 * | 11/2002 | Hubacher et al. | ............ | 709/229 |
| 2008/0028052 A1 * | 1/2008 | Currid et al. | ................... | 709/222 |
| 2008/0046708 A1 * | 2/2008 | Fitzgerald et al. | ................ | 713/2 |
| 2009/0193413 A1 * | 7/2009 | Lee | ................................... | 718/1 |

* cited by examiner

*Primary Examiner* — Chun Cao
(74) *Attorney, Agent, or Firm* — Baker Botts L.L.P.

(57) ABSTRACT

In one embodiment, a network boot program is received from a server via a first network interface controller associated with a first network identifier. The network boot program is executed. An operating system loader comprising an operating system driver is received from the server via the first network interface controller. The operating system driver identifies a second network interface controller associated with a second network identifier. The operating system driver associates the first network interface controller with the second network identifier and associates the second network interface controller with the first network identifier.

20 Claims, 3 Drawing Sheets

SWITCHING BETWEEN NETWORK INTERFACE CARDS DURING DIFFERENT STAGES OF OPERATION

TECHNICAL FIELD

This disclosure relates generally to information handling systems and, more particularly, to computing devices having multiple network interface controllers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 1:
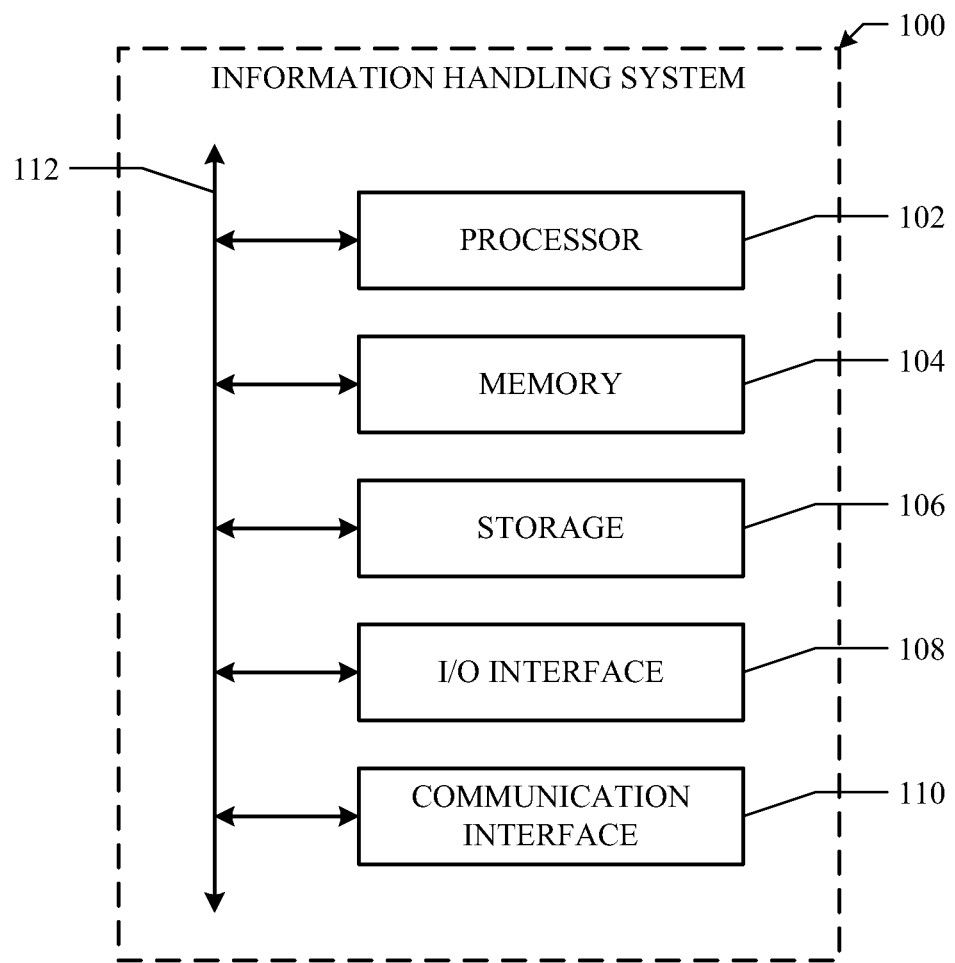
FIG. 1 is a block diagram of selected elements of an embodiment of a computing device including multiple network interface controllers.
Figure 2:
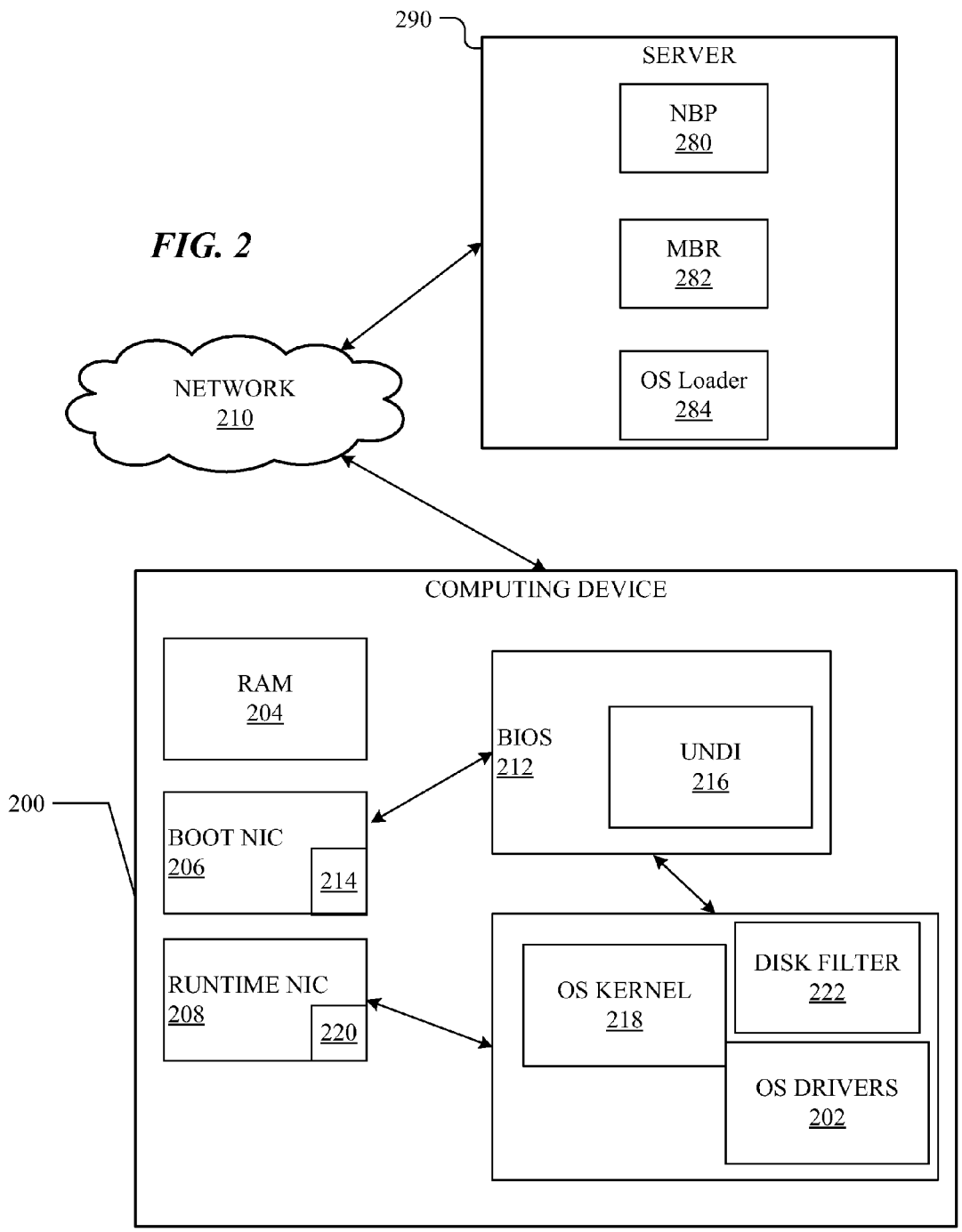
FIG. 2 is an example of a network environment in which a computing device in accordance with FIG. 1 may operate.
Figure 3:
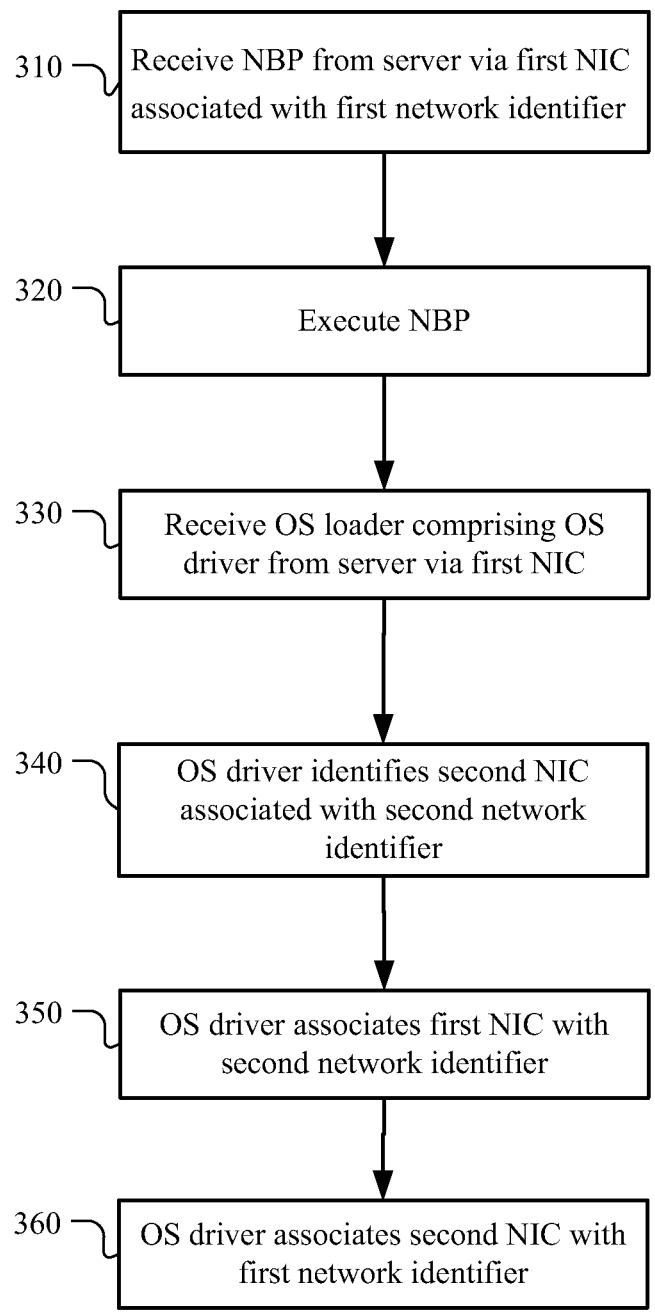
FIG. 3 is a flowchart depicting an example embodiment of dynamic NIC binding.

Particular embodiments are best understood by reference to FIGS. 1, 2, and 3 wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 comprises a computing device 200 that may be booted over a network 210. In particular embodiments, the computing device may be a PC, laptop, tablet, virtual machine, or any other suitable computing device capable of being network-booted. The computing device may be booted using network Pre-boot Execution Environment (PXE) booting, which may allow for the computing device to be booted from a network 210 without need for additional storage on the computing device beyond, for example, RAM 204. As an example, a complete operating system may be downloaded, installed, updated, or run on the computing device from a network using RAM of the computing device.

In particular embodiments, the computing device 200 may be prepared for the use of different network interface cards (NICs) 206, 208 (including, e.g., physical or virtual NICs) in different states including, for example, a boot process and a desktop operating session. This may be desirable, as different NICs may perform better during different states (e.g., a boot process state and a desktop operating session state). As an example, in some desktop virtualization environments (e.g., VMware Vsphere and Microsoft Hyper-V), the performance of clients (e.g., Dell Wyse WSM client) that deliver operating systems and applications to a computing device 200 via network streaming may not be on-par with physical hard disks at the computing device containing the same information. Having the ability to switch between different NICs during different stages of the operation of a computing device (e.g., the boot process and the desktop operating session) may allow for a user of the computing device or a client on the computing device to make use of the NIC that performs best in a specific stage. This may apply to both physical NICs as well as virtual NICs. In particular embodiments, the computing device 200 may be operable to switch between multiple NICs (e.g., physical or virtual) for any reason including performance or redundancy (e.g., so that a failure of one NIC does not cause a loss of connectivity of the computing device to a network). As an example, if a user of a laptop is connected to a network using a LAN cable (and a first NIC), and the user begins to boot the laptop over the network, according to one embodiment, the user may be able to unplug the laptop from the LAN cable, switch to using another network connection (e.g., wireless, Bluetooth, 3G, 4G/LTE, etc.) and a second NIC for the second network connection, and seamlessly continue using the laptop.

The computing device may, in particular embodiments, be configured with a reference virtual machine with an attached hard disk. As an example, a virtual machine with a pre-determined amount of storage (e.g., 100 MB) is created. At least two NICs 206, 208 (and in particular embodiments, multiple NICs) are created on the virtual machine. As an example, a higher-performance NIC and a lower-performance NIC may be created (e.g., using tools such as those provided by VMware). An operating system (e.g., Microsoft WINDOWS) is installed and configured for the virtual machine, necessary drivers are installed, and client software and drivers that communicate with the NICs and a network stack may be installed (e.g., the Dell Wyse WSM client). The client software may capture reads and writes from and to the operating system and the network. During the installation process, the client software (e.g., WSM) is configured so that a lower-performance NIC 206 may communicate with a boot server 290 and be used during a boot process, and a higher-performance NIC 208 may be used during the desktop operating session. Although server 290 is described as a boot server, it may include DHCP functionality, and may also provide OS streaming data to the computing device. In other embodiments, separate servers may provide the functionality of server 290.

In particular embodiments, the following actions may take place to allow for the use of different NICs (e.g., virtual or physical NICs) by the computing device. Although presented in a particular sequence, any suitable sequence of the following steps or actions may be performed. When the computing device 200 (configured as described above) is powered on, the BIOS 212 of the computing device runs. The BIOS may launch the PXE code 214 that may, for example, be a part of the firmware of one of the NICs 206 (e.g., the lower-performance NIC) that is then loaded into memory 204 and run. The PXE code 214 may load an UNDI (Universal Network Device Interface) stack 216. The PXE code may load network boot code through the use of the Dynamic Host Configuration Protocol (DHCP). The PXE code 214 of the lower-performance NIC 206 may send a DHCP Discovery request (e.g., a broadcast request) to network 210 and receive from a server 290 (a DHCP server or, e.g., a proxy) an IP address. In addition to the IP address, the PXE code 214 may receive information including a list of IP addresses of available PXE boot servers (which may, as illustrated in FIG. 2, include the same server 290 on which the DHCP server resides) on the network 210 (e.g., including different types of PXE boot servers) as well as the name or names of network boot program (NBP) files 280 that reside on the boot servers. The PXE code may then download the NBP 280 from a PXE boot server 290 on the network (using, for example, Trivial File Transfer Protocol), copy it to a location (e.g., a pre-determined location) in the RAM 204 of the computing device 200, and execute the NBP, thereby transferring control of the computing device to the NBP.

The NBP may set up a disk filter 222 that acts as an interface between the operating system kernel of the computing device 218 and the virtual disk (e.g., in RAM 204). This filter may be hooked to the BIOS UNDI network stack 216, which is bound to the low-performance or boot NIC 206. The filter may redirect all virtual disk and I/O requests to the server (e.g., 290) via the boot NIC's network connection. The NBP may retrieve the Master Boot Record (MBR) 282, the first sector of a virtual disk, from the boot server 290. Additionally, network identifiers including, for example, the IP address and MAC address of the boot NIC 206 (e.g., the lower-performance NIC) may be saved in a predetermined location in memory 204. The MBR may indicate where on the server 290 to retrieve the OS loader 284. The OS loader 284 is loaded into memory of the computing device 204 and launched, so that the operating system (e.g., Microsoft WINDOWS) kernel 218 and boot-critical drivers are loaded into memory. At this point, control of the computing device 200 is transferred to the kernel 218 of the operating system. Once triggered by the kernel, the operating system drivers 202 (e.g., Dell Wyse WSM), which may include disk filters 222, may be loaded and initialized. Various other drivers may also go through initialization. At this stage, a driver of the operating system 202 may retrieve from memory 204 the network identifiers, e.g., the IP address and MAC address, of the boot NIC 206. The driver 202 may then identify the higher-performance NIC 208 to be used by the operating system (e.g., WINDOWS) during runtime. Once this higher-performance NIC 208 is available, the OS driver 202 will bind to the high-performance NIC's port driver 220, so that the higher-performance NIC 208 may be used to send packets to and receive packets from the network 210.

To accomplish the binding and redirection with the higher-performance NIC 208, the OS driver 202 swaps (e.g., using an API or configuration mechanism provided by the OS) the personae of the boot NIC 206 (e.g., the lower-performance NIC) and the runtime NIC 208 (e.g., the higher-performance NIC). This may include, for example, swapping the network identifiers (e.g., MAC addresses) of the boot NIC and the runtime NIC. This may be accomplished in any of a number of ways including, for example, modifying registry entries of the computing device such that the original network identifier (e.g., MAC address) of the boot NIC is assigned to the runtime NIC, and the original network identifier (e.g., MAC address) of the runtime NIC is assigned to the boot NIC. In the Windows operating system, for example, a registry value under the target NIC's registry key is updated to override the permanent (e.g., hardware) MAC address programmed into the target NIC's EEPROM. As an example, in Windows, the registry value may be changed by accessing the target NIC's registry key (e.g., \Registry\Machine\System\ControlSet<NUMBER>\Control\Class\<NICregistrypath>\NetworkAddress) and by then hooking the function "NdisReadNetworkAddress" (a function provided by a Windows driver) to the specified NIC, so that it returns the MAC address for the specified NIC. As another example, in Linux, the MAC address of the target NIC may be changed by editing a file (e.g., the file/etc/network/interfaces) by adding an extra line to specify the new MAC address for the target NIC.

In performing this swap, a first connection (e.g., between the boot NIC 206 and a boot server 290) may be moved to the second (e.g., runtime) NIC 208 and the network 210 (e.g., a router or a server) may continue to send information to the same network identifier (e.g., MAC address). There need not, in this embodiment, be additional code to change DHCP/IP and MAC addresses with the server 290. In other embodiments, the first connection is closed, and a new connection is opened with the higher-performance NIC 208 (e.g., during runtime), and a new OS network stack may be set up with the higher-performance NIC. In particular embodiments, in addition to MAC addresses, other network identifiers or connection identification information (e.g., to enable communication with a boot server 290) may also be swapped between the NICs. By swapping network identifiers (e.g., MAC addresses) between the NICs, the runtime NIC 208 may inherit all network configurations of the boot NIC 206, including, for example, the IP address, gateway, subnet mask, etc. that were obtained for the boot NIC during the boot process.

FIG. 3 illustrates an example method 300 for dynamic NIC binding. The method may begin at step 310, where a network boot program is received from a server via a first network interface controller associated with a first network identifier. At step 320, the network boot program is executed. At step 330, an operating system loader comprising an operating system driver is received from the server via the first network interface controller. At step 340, the operating system driver identifies a second network interface controller associated with a second network identifier. At step 350, the operating system driver associates the first network interface controller with the second network identifier, and at step 360, the operating system driver associates the second network interface controller with the first network identifier. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for dynamic NIC binding including the particular steps of the method of FIG. 3, this disclosure contemplates any suitable method for dynamic NIC binding including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, receiving via a first network interface controller of the computing device a network boot program from a server, the first network interface controller associated with a first MAC address;
    by the computing device, executing the network boot program;
    by the computing device, receiving via the first network interface controller an operating system loader from the server, wherein the operating system loader comprises an operating system driver from the server;
    by the computing device, loading the operating system loader;
    by the operating system driver at the computing device, identifying a second network interface controller of the computing device, the second network interface controller associated with a second MAC address;
    by the operating system driver at the computing device, associating the first network interface controller with the second MAC address; and
    by the operating system driver at the computing device, associating the second network interface controller with the first MAC address.

2. The method of claim 1, wherein the computing device comprises one or more of the following:
    a laptop;
    a tablet computer;
    a desktop computer; or
    a virtual machine.

3. The method of claim 1, wherein the first network interface controller is operable for performance during a boot process of the computing device.

4. The method of claim 1, wherein the first network interface controller is virtual.

5. The method of claim 1, wherein the second network interface controller is operable for performance during runtime of the computing device.

6. The method of claim 1, wherein the second network interface controller is virtual.

7. The method of claim 1, wherein the operating system driver comprises a disk filter.

8. The method of claim 1, wherein associating the first network interface controller with the second MAC address comprises modifying a registry key associated with the first network interface controller.

9. The method of claim 1, wherein associating the second network interface controller with the first MAC address comprises modifying a registry key associated with the second network interface controller.

10. A method comprising:
    by a computing device, receiving via a first network interface controller of the computing device a network boot program from a server, the first network interface controller associated with a first network identifier;
    by the computing device, executing the network boot program;
    by the computing device, receiving via the first network interface controller an operating system loader from the server, wherein the operating system loader comprises an operating system driver from the server;
    by the computing device, loading the operating system loader;
    by the operating system driver at the computing device, identifying a second network interface controller of the computing device, the second network interface controller associated with a second network identifier;
    by the operating system driver at the computing device, associating the first network interface controller with the second network identifier; and
    by the operating system driver at the computing device, associating the second network interface controller with the first network identifier.

11. The method of claim 10, wherein the computing device comprises one or more of the following:
    a laptop;
    a tablet computer;
    a desktop computer; or
    a virtual machine.

12. The method of claim 10, wherein the first network interface controller is operable for performance during a boot process of the computing device.

13. The method of claim 10, wherein the first network interface controller is virtual.

14. The method of claim 10, wherein the second network interface controller is operable for performance during runtime of the computing device.

15. The method of claim 10, wherein the second network interface controller is virtual.

16. The method of claim 10, wherein the operating system driver comprises a disk filter.

17. The method of claim 10, wherein associating the first network interface controller with the second network identifier comprises modifying a registry key associated with the first network interface controller.

18. The method of claim 10, wherein associating the second network interface controller with the first network identifier comprises modifying a registry key associated with the second network interface controller.

19. One or more computer-readable non-transitory storage media embodying software that is operable when executed to:
    receive via a first network interface controller of a computing device a network boot program from a server, the first network interface controller associated with a first network identifier;
    execute the network boot program;

receive via the first network interface controller an operating system loader from the server, wherein the operating system loader comprises an operating system driver from the server;

load the operating system loader;

identify a second network interface controller of the computing device, the second network interface controller associated with a second network identifier;

associate the first network interface controller with the second network identifier; and associate the second network interface controller with the first network identifier.

20. The media of claim 19, the software further operable when executed to:

associate the first network interface controller with the second network identifier by modifying a registry key associated with the first network interface controller; and associate the second network interface controller with the first network identifier by modifying a registry key associated with the second network interface controller.

\* \* \* \* \*